(12) United States Patent
Takizawa et al.

(10) Patent No.: US 8,197,560 B2
(45) Date of Patent: Jun. 12, 2012

(54) FUEL FOR FUEL CELL, FUEL CARTRIDGE FOR FUEL CELL AND FUEL CELL

(75) Inventors: Yumiko Takizawa, Yokohama (JP); Daisuke Imoda, Yokohama (JP); Kyoko Yoshino, Yokohama (JP)

(73) Assignees: Kabushiki Kaisha Toshiba, Tokyo (JP); Toyo Seikan Kaisha, Ltd., Tokyo (JP)

( * ) Notice: Subject to any disclaimer, the term of this patent is extended or adjusted under 35 U.S.C. 154(b) by 947 days.

(21) Appl. No.: 11/917,359

(22) PCT Filed: Jun. 14, 2006

(86) PCT No.: PCT/JP2006/311939
§ 371 (c)(1),
(2), (4) Date: Dec. 13, 2007

(87) PCT Pub. No.: WO2006/134975
PCT Pub. Date: Dec. 21, 2006

(65) Prior Publication Data
US 2010/0136458 A1    Jun. 3, 2010

(30) Foreign Application Priority Data

Jun. 17, 2005   (JP) .................. 2005-178048

(51) Int. Cl.
*C10L 1/18*   (2006.01)
(52) U.S. Cl. ................ 44/451; 44/329; 44/351; 44/388; 44/403; 44/432; 44/445; 44/448
(58) Field of Classification Search ............ 44/451, 44/329, 351, 388, 403, 432, 445, 448
See application file for complete search history.

(56) References Cited

U.S. PATENT DOCUMENTS

| | | | | |
|---|---|---|---|---|
| 4,801,305 | A | * | 1/1989 | Muller et al. ................. 44/451 |
| 5,024,678 | A | * | 6/1991 | Mertens-Gottselig et al. . 44/348 |
| 5,904,740 | A | | 5/1999 | Davis |
| 5,928,745 | A | | 7/1999 | Wood et al. |
| 6,521,364 | B1 | * | 2/2003 | Autenrieth ................. 429/505 |
| 2003/0044666 | A1 | | 3/2003 | Fan et al. |
| 2003/0064258 | A1 | | 4/2003 | Pan et al. |
| 2004/0018410 | A1 | | 1/2004 | Dai |
| 2004/0173615 | A1 | | 9/2004 | Goodman |

(Continued)

FOREIGN PATENT DOCUMENTS

JP         2002 110199         4/2002

(Continued)

OTHER PUBLICATIONS

The Chemical Engineering Dictionary, $1^{st}$ edition, Combustion Chemistry Engineering Press [transliterated], Sep. 30, 1973, 1 front page, pp. 156 and 353.

(Continued)

*Primary Examiner* — Cephia D Toomer
(74) *Attorney, Agent, or Firm* — Oblon, Spivak, McClelland, Maier & Neustadt, L.L.P.

(57) ABSTRACT

Disclosed is a fuel for fuel cells which contains at least one organic compound selected from the group consisting of methanol, ethanol, dimethyl ether and formic acid, and 1-200 ppm of a hydrocarbon compound in terms of a single component as determined by gas chromatography mass spectrometry. Also disclosed are a fuel cartridge for fuel cells and a fuel cell.

5 Claims, 6 Drawing Sheets

U.S. PATENT DOCUMENTS

2005/0058879 A1 3/2005 Guay
2005/0255344 A1* 11/2005 Imai et al. .................. 429/13

FOREIGN PATENT DOCUMENTS

| JP | 2003 100315 | 4/2003 |
| JP | 2003-346863 | 12/2003 |
| JP | 2004-6335 | 1/2004 |
| JP | 2004 31163 | 11/2004 |
| JP | 2005 71713 | 3/2005 |
| JP | 2005 116211 | 4/2005 |
| JP | 2005 129518 | 5/2005 |
| JP | 2006-313701 | 11/2006 |
| WO | WO 03/100898 A1 | 12/2003 |
| WO | WO 2004/102717 A1 | 11/2004 |

OTHER PUBLICATIONS

European Office Action issued Mar. 1, 2011, in Patent Application No. 06 766 708.9.

Korean Office Action issued Jul. 30, 2011, in Patent Application No. 2007-7028632 (with English-language translation).

* cited by examiner

US 8,197,560 B2

FUEL FOR FUEL CELL, FUEL CARTRIDGE FOR FUEL CELL AND FUEL CELL

CROSS REFERENCE

This is a U.S. national phase application under 35 U.S.C. §371 of International Application PCT/JP2006/311939 (not published in English), filed Jun. 14, 2006.

TECHNICAL FIELD

The present invention relates to a fuel for fuel cell, a fuel cartridge for fuel cell and a fuel cell.

BACKGROUND ART

Recent years, various electronic devices such as personal computers and mobile telephones have been reduced in size in accordance with the advance of the semiconductor technology. As the downsizing of the electronic devices proceeds, there have been attempts of using fuel cells as the power for the small-sized devices. The fuel cell can generate electrical power simply by supplying a fuel and an oxidizer thereto, and has such an advantage that it can continuously generate the electrical power by replacing the fuel. Because of such an advantage, the fuel cell, if it can be reduced in size, is considered to be an extremely useful system for driving mobile electronic devices. In particular, a direct methanol fuel cell (DMFC) is a promising power source for small-sized devices since it uses methanol, which has a high energy density and can be easily handled as compared to the hydrogen gas fuel, and electrical current can be obtained from methanol on an electrode catalyst without requiring any reforming instrument.

There are several methods of supplying fuel to a DMFC, for example, a gas-supply type DMFC in which liquid fuel is gasified and fed into the fuel cell with a blower or the like, a liquid-supply DMFC in which liquid fuel is fed into the fuel cell with a pump, and an internal gasifying type DMFC in which liquid fuel is gasified within the fuel cell. Of these, the internal gasifying type DMFC requires no large-scale equipments such as pump or blower for supplying the fuel. Therefore, the concentration of the liquid fuel is increased and the liquid fuel tank can be reduced in size, it becomes possible to achieve the realization of a small-sized fuel cell having a high energy density.

It should be pointed out here that Jpn. Pat. Appln. KOKAI Publication No. 2004-311163 discloses an improvement of the performance of a cell, which can be achieved by regulating the density of an organic compound component (formic acid, acetic acid or oxalic acid) contained in a catalyst layer of an electrode of the fuel cell.

DISCLOSURE OF INVENTION

An object of the present invention is to provide a fuel for a fuel cell, a fuel cartridge for a fuel cell and a fuel cell, which can improve the stability in generation of electric power for a long time.

According to an aspect of the present invention, there is provided a fuel for a fuel cell, comprising: at least one type of organic compound selected from the group consisting of methanol, ethanol, dimethylether and formic acid; and a hydrocarbon-based compound in amount of 1 to 200 ppm in terms of a single component measured by a gas chromatography mass spectrometry.

According to another aspect of the present invention, there is provided a fuel cartridge for a fuel cell, comprising: a fuel container and a fuel contained in the container, the fuel contains at least one type of organic compound selected from the group consisting of methanol, ethanol, dimethylether and formic acid, and a hydrocarbon-based compound in amount of 1 to 200 ppm in terms of a single component measured by a gas chromatography mass spectrometry.

According to still another aspect of the present invention, there is provided a fuel cell comprising:

a fuel storage portion which stores a fuel containing at least one type of organic compound selected from the group consisting of methanol, ethanol, dimethylether and formic acid;

a fuel gasifying portion that allows a gasified component of the fuel to pass through; and a membrane electrode assembly including a fuel electrode to which the gasified component is supplied, an oxidizer electrode and a polymer electrolyte membrane provided between the fuel electrode and the oxidizer electrode, wherein an amount of a hydrocarbon-based compound contained in the fuel held in the fuel storage portion, the fuel gasifying portion and the membrane electrode assembly is 1 to 1500 ppm in terms of a single component measured by a gas chromatography mass spectrometry.

BEST MODE FOR CARRYING OUT THE INVENTION

Figure 1:
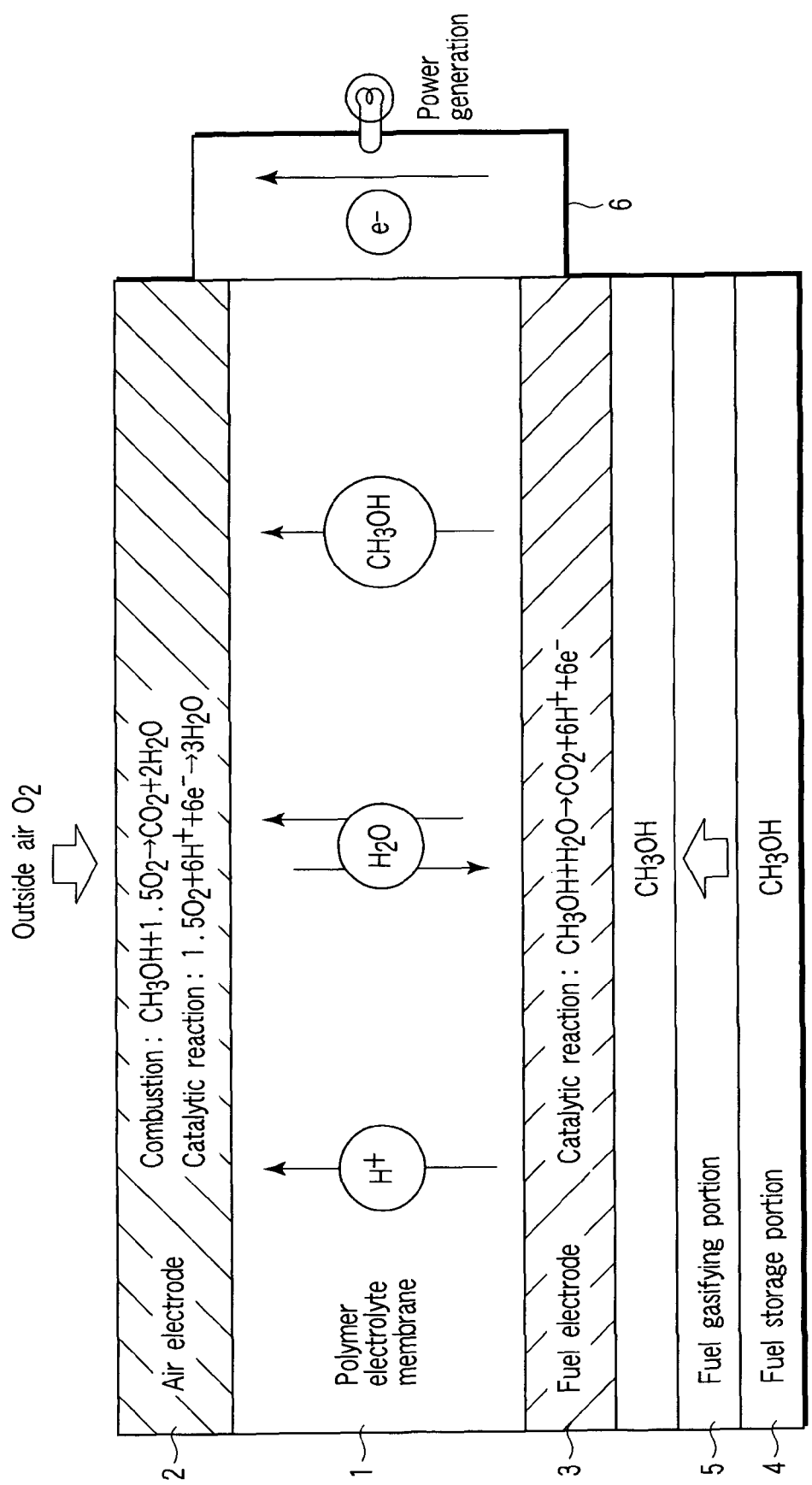
FIG. 1 is a diagram conceptually showing a fuel cell according to an embodiment of the present invention.

First, the liquid fuel for a fuel cell will now be described.

The fuel component of the liquid fuel contains at least one type of organic compound selected from the group consisting of methanol, ethanol, dimethylether and formic acid. The fuel component may be of a liquid containing an organic compound(s) or may be an aqueous solution of an organic compound(s). For example, in the case where methanol is selected as the fuel component, it is preferable that the methanol concentration in the liquid fuel should be 50% by mole or more. A more preferable range is a concentration exceeding 50% by mole, and most preferably, pure methanol should be used. With this structure, the container for the liquid fuel can be reduced in size, and further the energy density can be increased. The purity of pure methanol should preferably be set to 95% by weight or more and 100% by weight or less.

The liquid fuel contains a hydrocarbon-based compound in amount of 1 to 200 ppm in terms of a single component measured by a gas chromatography mass spectrometry.

The conditions for the gas chromatography mass spectrometry (GC-MS) will be described. As the spectrometric column, DB-WAX (30 m×0.25 mmΦ) or an instrument that has functions equivalent to those of this device can be used. The injection temperature is set to 220° C. and the column temperature is raised from 50° C. to 220° C. in the spectrometry. The temperature increasing rate is set to one in a range of 4 to 7° C. per minute. The detection is carried out in the total ion chromatogram of the mass spectroscope under the condition that the scanning mass number is 45 to 425.

In the GC-MS, when the abundance ratio of a particular component is 50% or more, the concentration is calculated out assuming that the hydrocarbon-based compound is a single component made of the particular component. It should be noted that the abundance ratio is calculated from the peak intensity of the GC-MS.

In the case where the fuel is made of a number of components where any one of them does not have an abundance ratio of 50% or more, the concentration is calculated out supposing that the hydrocarbon-based compound is $C_{20}H_{40}$ (icosane).

The reason why the concentration of the hydrocarbon-based compound is defined within the above-described range will now be described.

When the concentration of the organic compound in the liquid fuel is increased, the low-molecular weight hydrocarbon-based compound (such as monomer, degradated product of polymer or additive for polymer) becomes easily elutable from the polymeric part material (such as fuel cartridge) of the fuel cell. The eluted hydrocarbon-based compound is accumulated on the membrane electrode assembly (MEA), thereby causing an increase in resistance and clogging of the gas diffusion layer of the electrode. The inventors of the present invention carried out intensive studies on the above-described subject, and found that if a very small amount of the hydrocarbon-based compound is added rather than being completed eliminated, the elution is suppressed from the time of the addition. They further found that when the concentration is 1 ppm or more, the long-term stability can be improved; however if the concentration exceeds 200 ppm, a high output may not be obtained due to an increase in resistance and a decrease in gas diffusibility.

Therefore, when the concentration of hydrocarbon-based compound is set in a range of 1 ppm or more but 200 ppm or less, the long-term stability can be improved while maintaining a high output. A preferable range is 5 to 150 ppm, and a more preferable range is 10 to 100 ppm.

Examples of the hydrocarbon-based compound are a monomer, a degradated product of polymer and an additive for polymer. There may be one or more types of hydrocarbon-based compounds.

Examples of the monomer are ethylene, α-olefin, acrylic acid, maleic anhydride, propylene, hexamethylenediamine, adipic acid, ε-caprolactam, ω-laurolactam, dodecanoic acid, terephthalic acid, ethyleneglycol and cyclohexanedimethanol.

An example of the degradated product of polymer is a polymer of several to several tens of monomers (for example, dimmer and quintomer) of the above-described one.

Examples of the additive for polymer will now be described.

Examples of the antistatic agent are alkyldiethanolamine, glycerine fatty acid ester, hydroxylalkylmonoethanolamine and alkyldiethanolamine mono fatty acid ester.

Examples of the lubricant are stearic acid amide, oleic amide, erucic amide, calcium stearate, zinc stearate and magnesium stearate.

Examples of the flame retardant are a bromine-based compound (DBDPO), a chlorine-based compound (Dechlorane Plus) and a hydrate metal compound.

Example of the nucleation agent are sorbitol-based agent, phosphoester-based agent, a talc (hydrous magnesium silicate).

Examples of the coupling agent are a silane coupling agent and a titanate coupling agent.

Examples of the antioxidant are a phenol-based agent, a phosphorus-based agent and a sulfur-based agent.

Examples of the UV absorbent are a benzophenone-based agent and a hydroxyphenol-triazine-based agent.

An example of the multifunctional stabilizer is a hindered amine-based light stabilizer (HALS).

Examples of the stabilizer (neutralizer) are metal soap and hydrotarcite (Mg, Al).

Of the above-described additives, hydrocarbon-based compounds are detected by the GC-MS.

The fuel cartridge in which the liquid fuel is contained will now be described.

Examples of the fuel cartridge are a liquid fuel container having a liquid fuel outlet. The fuel cartridge may be of a detachable type or a fixed but fuel-replenishable type.

Examples of the polymeric material for the liquid fuel container are low-density polyethylene (LDPE), high-density polyethylene (HDPE), linear low-density polyethylene (LLDPE), denatured polyethylene, polypropylene (PP), polyamide (PA) and polyethyleneterephthalate (PET).

The type of hydrocarbon-based compound eluted into the liquid fuel greatly depends on the material for the container of the fuel cartridge. Types of hydrocarbon-based compounds (monomers) which are easily eluted will now be indicated in groups of types of the fuel cartridge.

Low-density polyethylene (LDPE): ethylene
High-density polyethylene (HDPE), Linear low-density polyethylene (LLDPE): ethylene, α-olefin
Denatured polyethylene: ethylene, acrylic acid, maleic anhydride
Polypropylene (PP): propylene, ethylene, α-olefin
Polyamide (PA): hexamethylenediamine, adipic acid, ε-caprolactam, ω-laurolactam, dodecanoic acid
Polyethyleneterephthalate (PET): terephthalic acid, ethyleneglycol, cyclohexanedimethanol Examples of the fuel cell that uses the above-described liquid fuel or fuel cartridge are a liquid fuel-supply type cell and an internal gasifying-type cell. The internal gasifying type cell has such a structure that a gasified component of a liquid fuel is supplied to a fuel electrode, and therefore it is desired that a high-concentration liquid fuel should be used in order to assure a sufficient amount of gasifying. Further, since the hydrocarbon-based compound in the liquid fuel is concentrated due to the gasifying, the problem of clogging of the fuel gasifying unit may be created. Thus, when the amount of the hydrocarbon-based compound is regulated in the internal gasifying-type fuel cell, a sufficient improvement in performance can be achieved.

FIG. 1 shows a conceptual diagram of the internal gasifying-type fuel cell.

As shown in FIG. 1, the membrane electrode assembly (MEA) includes a proton-conductive polymer electrolyte membrane 1, an air electrode (oxidizer electrode) 2 formed on one surface of the electrolyte membrane 1 and a fuel electrode 3 formed on an opposite surface of the electrolyte membrane 1.

It is preferable that the polymer electrolyte membrane should contain a proton-conductive material as a main component. Examples of the proton-conductive material are a fluorine-based resin having a sulfonic acid group (such as a perfluorosulfonic acid polymer), a hydrocarbon-based resin having a sulfonic acid group and inorganic materials such as tungstic acid and phosphorus tungstate; however the material is not limited to these examples.

Each of the air electrode 2 and fuel electrode 3 is equipped with a catalytic layer and a gas diffusion layer. Examples of the catalyst contained in the catalyst layer are platinum metal elements (such as Pt, Ru, Rh, Ir, Os and Pd) and an alloy containing a platinum metal element. It is preferable that Pt—Ru, which has a strong resistance to methanol or carbon monoxide should be used as the fuel electrode catalyst, whereas platinum should be used as the air electrode catalyst; however the catalysts are not limited to these materials. It is alternatively possible to use a supported catalyst that uses an electro-conductive supporter such as a carbon material, or it may be a non-supported catalyst. As the gas diffusion layer, carbon paper, for example, can be used.

As the fuel storage portion 4, a fuel cartridge, for example, can be used. A fuel outlet of the fuel cartridge is connected to the fuel gasifying portion.

A gas-liquid separation membrane serving as the fuel gasifying portion 5 allows only the gasified component of the liquid fuel to pass therethrough, and thus the liquid component of the fuel cannot pass therefore. It should be noted reference numeral 6 denotes an external circuit.

An electric power generating reaction in the case where methanol is used as a fuel in a fuel cell having the above-described structure will now be described. The gasified component of the liquid fuel supplied from the fuel outlet of the fuel cartridge 4 is allowed to pass through the gas-liquid separation membrane and guided to the fuel electrode 3. At the fuel electrode 3, a catalytic reaction represented by the following reaction formula (1) occurs.

$$CH_3OH + H_2O \rightarrow CO_2 + 6H^+ + 6e^- \quad (1)$$

It should be noted that water used in the reaction formula (1) may be supplied from the liquid fuel or water in the polymer electrolyte membrane 1 can be used.

Protons ($H^+$) generated from the reaction represented in the formula (1) are allowed to pass through the polymer electrolyte membrane 1 and supplied to the air electrode 2. Electrons flow through the external circuit 6 to the air electrode 2. The air, which serves as an oxidizing agent, is taken from an external environment. At the air electrode 2, the catalytic reaction represented in the following reaction formula (2), that is, the electric power generating reaction, occurs.

$$(3/2)O_2 + 6H^+ + 6e^- \rightarrow 3H_2O \quad (2)$$

An overall reaction formula of the catalytic reactions (1) and (2) is represented in the following formula (3).

$$CH_3OH + (3/2)O_2 \rightarrow CO_2 + H_2O \quad (3)$$

A fuel cell such as described above exhibits an improved long-term stability while maintaining a high output when the amount of the hydrocarbon-based compound in the fuel held in the liquid fuel storage portion 4, the fuel gasifying portion 5 and the membrane electrode assembly is regulated to 1 to 1500 ppm in terms of a single component measured by a gas chromatography mass spectrometry.

How to measure the concentration of the hydrocarbon-based compound will now be explained.

The liquid fuel component present in each of the liquid fuel storage portion, the fuel gasifying portion and the membrane electrode assembly can be collected with a microsyringe or the like, and the collected liquid fuel component can be subjected to the analysis. In order to extract the fuel component impregnated in these members, the liquid fuel storage portion, the fuel gasifying portion and the membrane electrode assembly are immersed in a type of methanol used in precise analysis, for several hours at room temperature (a smallest possible amount of methanol, for example, about 5 to 10 ml), and thus the component is filtrated out. Thus, the fuel components collected and extracted from the liquid fuel storage portion, the fuel gasifying portion and the membrane electrode assembly are gathered all together to prepare a sample, which is subjected to the gas chromatography mass spectrometry. With regard to the gas chromatography mass spectrometry and the single component conversion, refer to the descriptions of these provided before.

Examples of the present invention will now be described in detail with reference to accompanying drawings.

EXAMPLE 1

<Preparation of Anode>

A perfluorocarbon sulfonic acid solution, water and methoxypropanol were added to an anode catalyst (Pt:Ru=1:1) supported carbon black to disperse the catalyst supported carbon black in the mixture, thereby preparing a paste. The thus prepared paste was applied onto porous carbon paper serving as an anode gas diffusing layer, and thus an anode catalyst layer was obtained.

<Preparation of Cathode>

A perfluorocarbon sulfonic acid solution, water and methoxypropanol were added to a cathode catalyst (Pt) supported carbon black to disperse the catalyst supported carbon black in the mixture, thereby preparing a paste. The thus prepared paste was applied onto porous carbon paper serving as a cathode gas diffusing layer, and thus a cathode catalyst layer was obtained.

A perfluorocarbon sulfonic acid membrane (Nafion film of Du Pont) having a water content of 10 to 20% by weight and serving as a proton conductive electrolyte membrane was placed between the anode catalyst layer and cathode catalyst layer, and they were subjected to hot press, and thus a membrane electrode assembly (MEA) was obtained.

As the liquid-gas separation film, a silicone rubber sheet was prepared.

Figure 2:
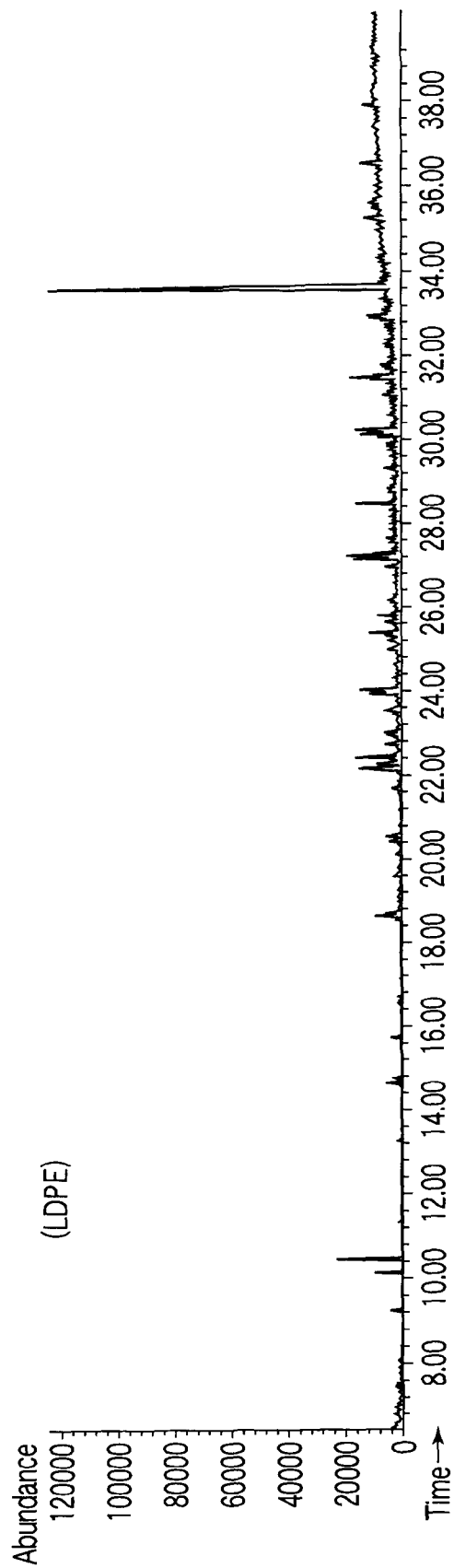
FIG. 2 is a chart diagram showing results of gas chromatography mass spectrometry of a liquid fuel for the fuel cell of Example 1.

Methanol containing 10 ppm of the hydrocarbon-based compound measured in terms of $C_{20}H_{40}$ by the gas chromatography mass spectrometry and having a purity of 99.9% by weight was contained in a fuel cartridge having a liquid fuel container made of a low-density polyethylene (LDPE). The results of the gas chromatography mass spectrometry of the liquid fuel used in Example 1 are shown in FIG. 2. In FIG. 2, the horizontal axis indicates the time and the vertical axis indicates the abundance. As shown in this figure, the hydrocarbon-based compound was a type that contains degraded products of ethylene monomer, dimer of ethylene, α-olefin monomer and polyethylene and has 10 to 30 carbons.

The conditions for the gas chromatography mass spectrometry were as follow. As the spectrometric column, DB-WAX (30 m×0.25 mmΦ) was used. The injection temperature was set to 220° C. and the column temperature was raised from 50° C. to 220° C. in the spectrometry. The temperature increasing rate was set to one in a range of 6° C. per minute. The detection was carried out in the total ion chromatogram of the mass spectroscope under the condition that the scanning mass number was set to 45 to 425.

With the obtained membrane electrode assembly, the gas-liquid separation film and the fuel cartridge, an internal gasifying type direct methanol fuel cell having a structure as shown in FIG. 1 was assembled.

EXAMPLE 2

An internal gasifying type direct methanol fuel cell having a structure similar to that of Example 1 was assembled except that the concentration of the hydrocarbon-based compound in the liquid fuel was set to 50 ppm.

EXAMPLE 3

An internal gasifying type direct methanol fuel cell having a structure similar to that of Example 1 was assembled except that the concentration of the hydrocarbon-based compound in the liquid fuel was set to 100 ppm.

EXAMPLE 4

Figure 3:
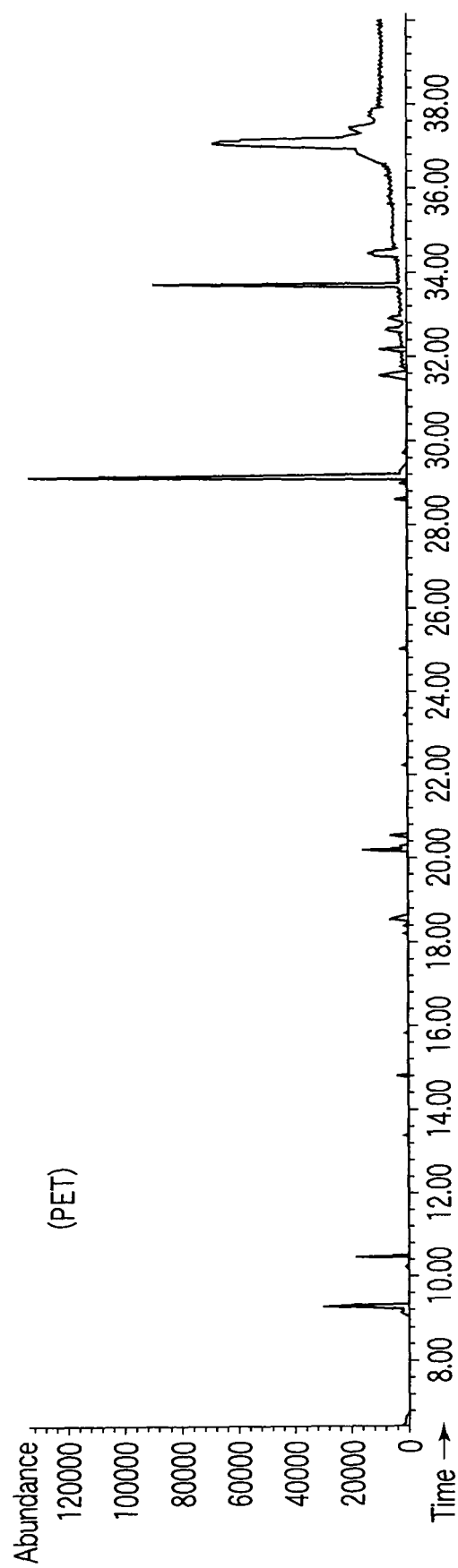
FIG. 3 is a chart diagram showing results of gas chromatography mass spectrometry of a liquid fuel for the fuel cell of Example 4.

Methanol containing 50 ppm of the hydrocarbon-based compound measured in terms of dimethylterephthalate (DMT) by the gas chromatography mass spectrometry and having a purity of 99.9% by weight was contained in a fuel cartridge having a liquid fuel container made of a non-drawn material of polyethyleneterephthalate (PET) denatured by 1,4-cyclohexandimethanol. The results of the gas chromatography mass spectrometry of the liquid fuel used in Example 4 are shown in FIG. 3. In FIG. 3, the horizontal axis indicates the time and the vertical axis indicates the abundance. As shown in this figure, the hydrocarbon-based compound was a type that contains dimethylterephthalate (DMT), ethylene glycol and cyclohexanedimethanol. The abundance of DMT in the hydrocarbon-based compound was 50% or more.

An internal gasifying type direct methanol fuel cell having a structure similar to that of Example 1 was assembled except that the above-described fuel cartridge was employed.

EXAMPLE 5

Methanol containing 0.5 ppm of the hydrocarbon-based compound measured in terms of $C_{20}H_{40}$ by the gas chromatography mass spectrometry and having a purity of 99.95% by weight was contained in a fuel cartridge having a liquid fuel container made of a linear low-density polyethylene (LL-DPE).

An internal gasifying type direct methanol fuel cell having a structure similar to that of Example 1 was assembled except that the above-described fuel cartridge was employed.

EXAMPLE 6

An internal gasifying type direct methanol fuel cell having a structure similar to that of Example 1 was assembled except that the concentration of the hydrocarbon-based compound in the liquid fuel was set to 205 ppm.

EXAMPLE 7

An internal gasifying type direct methanol fuel cell having a structure similar to that of Example 1 was assembled except that the concentration of the hydrocarbon-based compound in the liquid fuel was set to 1505 ppm.

Figure 4:
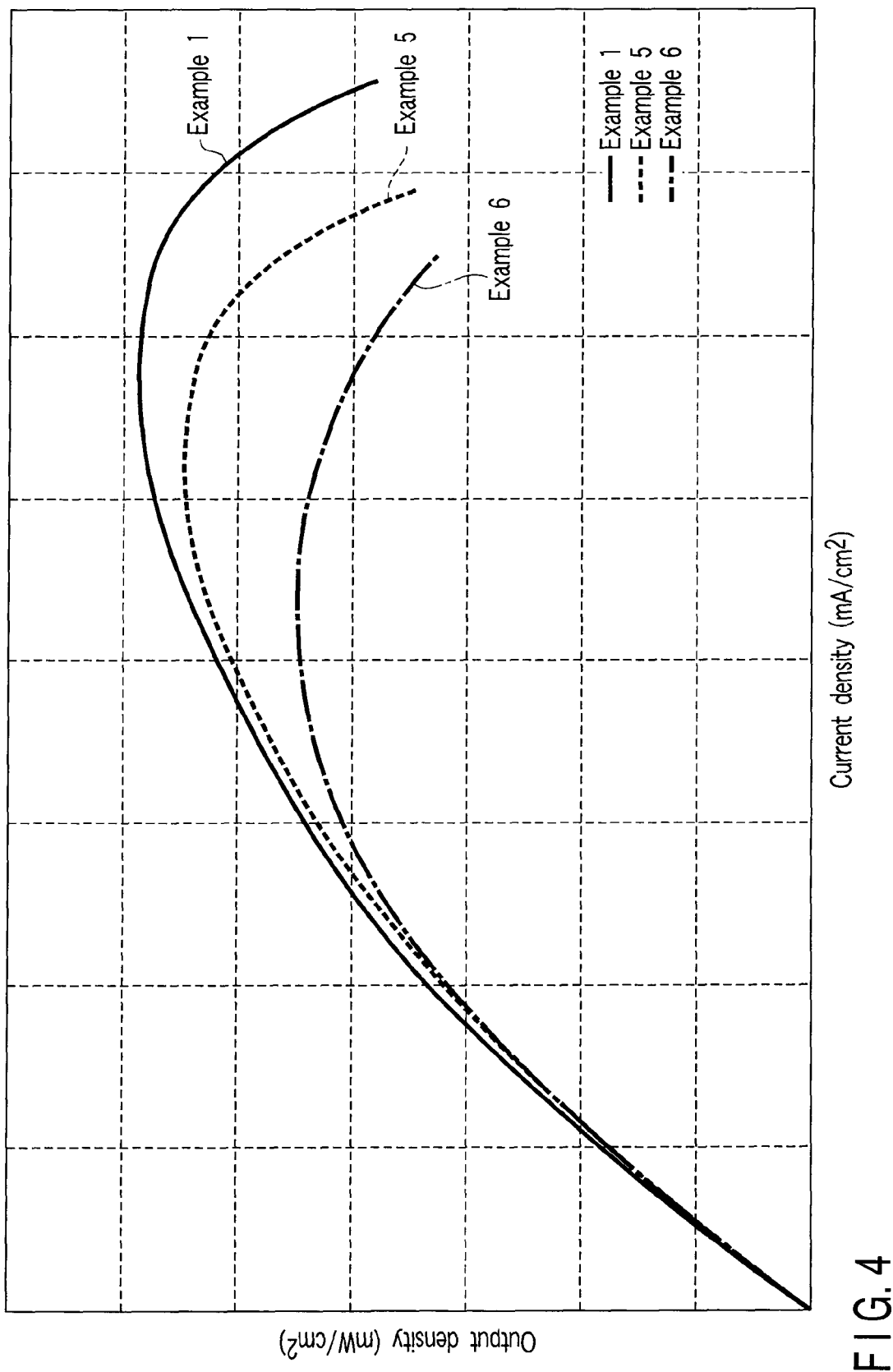
FIG. 4 is a characteristic diagram showing a relationship between a current density and an output density in the fuel cell of each of Examples 1, 5 and 6.

The fuel cells obtained in Examples 1, 5 and 6 were measured in terms of the change in output density when the current density was increased, and the results were summarized in FIG. 4. In FIG. 4, the horizontal axis indicates the current density ($mA/cm^2$) and the vertical axis indicates the output density ($mW/cm^2$).

As is clear from FIG. 4, the fuel cell of Example 1 in which the liquid fuel having a concentration of the hydrocarbon-based compound of 1 to 200 ppm was employed exhibited a higher peak in output density than that of Example 5 (the concentration of the hydrocarbon-based compound being less than 1 ppm) or than that of Example 6 (the concentration of the hydrocarbon-based compound exceeding 200 ppm). Further, the cell of Example 1 showed a peak in output density at a higher current density than those of Examples 5 and 6.

Figure 5:
FIG. 5 is a characteristic diagram showing a change in current value along with time in the fuel cell of each of Examples 1, 2, and 4 to 6.

With regard to the fuel cells of Examples 1, 2 and 4 to 7, the change in current value along with time was measured in order to examine the effect on the long term performance by impurities in the fuel. The results were summarized in FIG. 5. In FIG. 5, the horizontal axis indicates the test time and the vertical axis indicates the current value. It should be noted that Example 7 in which the liquid fuel having a concentration of the hydrocarbon-based compound exceeding 1500 ppm was employed had a low initial current value as compared to those of the other examples, and therefore it was not measured in terms of the change in current value along with time.

As is clear from FIG. 5, the fuel cell of each of Examples 1, 2, 4 and 6 in which the liquid fuel having a concentration of the hydrocarbon-based compound of 1 to 1500 ppm was employed exhibited a lower initial current value than that of Example 5, but the decrease in current value during the test was gentle. Especially, the fuel cells of Examples 1, 2 and 4 in which the liquid fuel having a concentration of the hydrocarbon-based compound of 1 to 200 ppm was employed was able to maintain a high current value during the tests as compared to the case of Example 6 in which the concentration of the hydrocarbon-based compound exceeded 200 ppm.

By contrast, the fuel cell of Example 5 in which the liquid fuel having a concentration of the hydrocarbon-based compound of less than 1 ppm was employed showed an abrupt current drop even from the beginning of the test, and the current became lower than those of Examples 1, 2, 4 and 6 in the middle of the test.

After the performance tests shown in FIGS. 4 and 5, the fuel cells of Examples 1 to 7 were measured in terms of the concentration of the hydrocarbon-based compound held in the fuel cartridge, liquid-gas separation membrane and membrane electrode assembly under the before-mentioned conditions. The results were: 10 ppm in Example 1, 47 ppm in Example 2, 97 ppm in Example 3, 46 ppm in Example 4, 0.5 ppm in Example 5, 202 ppm in Example 6 and 1502 ppm in Example 7.

Figure 6:
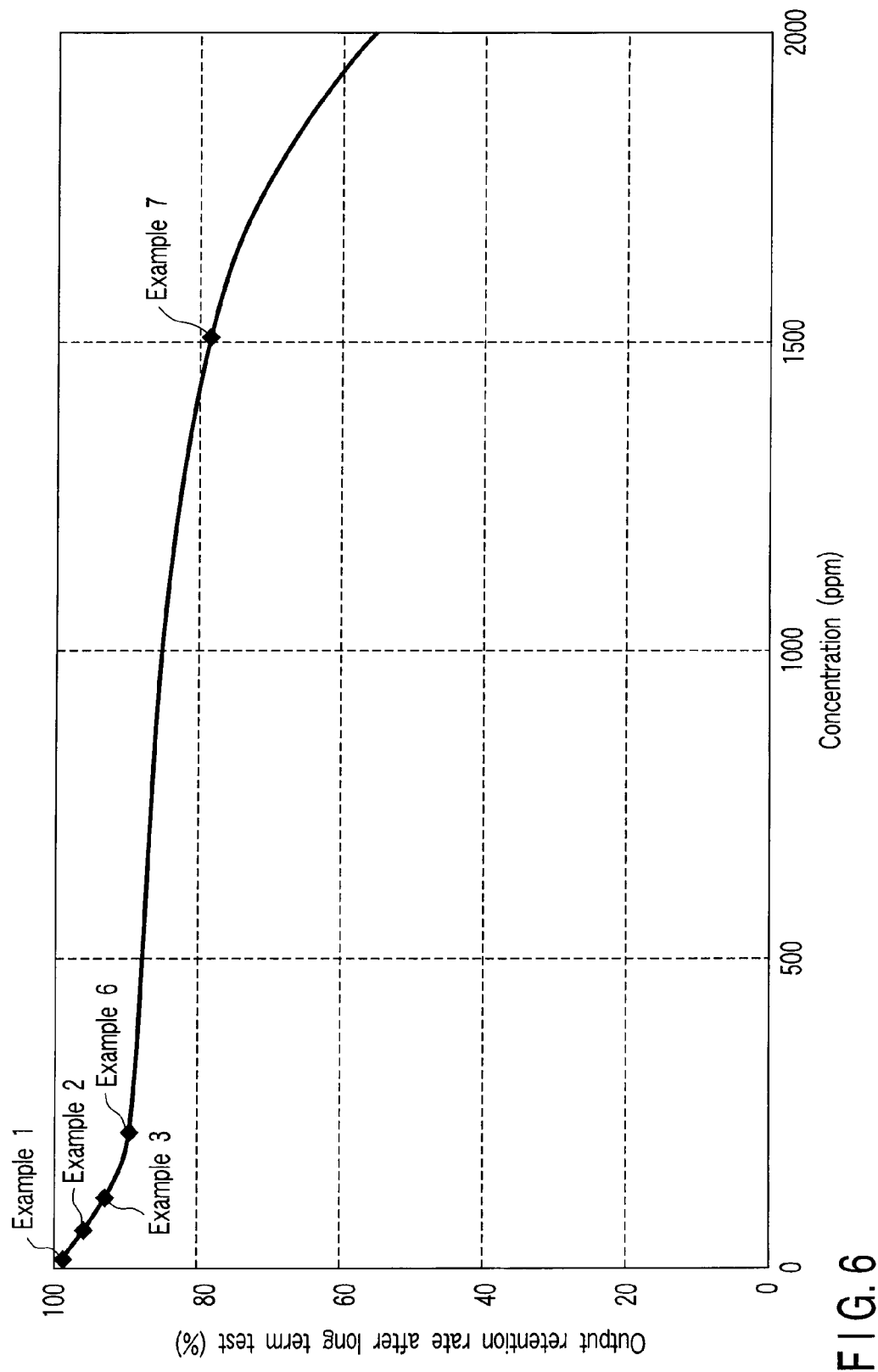
FIG. 6 is a characteristic diagram showing a relationship between a total amount of hydrocarbon-based compound and an output retention rate after long-term test in the fuel cell of each of Examples 1, 2, 3, 6 and 7.

With regard to the fuel cells of Examples 1, 2, 3, 6 and 7, the output of the cell after being driven continuously for 1000 hours was measured and the output retention rate (%) in the long term test was calculated out (expressed with reference to the initial output being 100%). The results were as shown in FIG. 6. In FIG. 6, the horizontal axis indicates the concentration (ppm) of the hydrocarbon-based compound held in the fuel cartridge, liquid-gas separation membrane and membrane electrode assembly, and the vertical axis indicates the output retention rate (%) in the long term text.

As is clear from FIG. 6, the fuel cell of each of Examples 1 to 3 and 6 in which the concentration of the hydrocarbon-based compound in the fuel cell was 1 ppm or higher but 1500 ppm or less was employed exhibited an excellent output retention rate in the long term test as compared to that of Example 7, in which the concentration of the hydrocarbon-based compound in the fuel cell exceeded 1500 ppm. From the results of FIG. 6, it can be further understood that as the concentration of the hydrocarbon-based compound in the fuel cell is lower, a higher output retention rate in the long term test can be obtained.

INDUSTRIAL APPLICABILITY

According to the present invention, there is provided a fuel for a fuel cell, a fuel cartridge for a fuel cell and a fuel cell, which can improve the stability in generation of electric power for a long time.

The invention claimed is:

1. A fuel for fuel cell, comprising:
   at least one organic compound selected from the group consisting of methanol, ethanol, dimethylether and formic acid; and
   at least one additive selected from the group consisting of ethylene, α-olefin, acrylic acid, maleic anhydride, propylene, hexamethylenediamine, adipic acid, ε-caprolactam, ω-laurolactam, dodecanoic acid, terephthalic acid, ethyleneglycol, and cyclohexanedimethanol, in amount of 1 to 200 ppm in terms of a single component measured by a gas chromatography mass spectrometry.

2. The fuel for fuel cell according to claim 1, wherein a concentration of the at least one additive falls within a range of 5 to 150 ppm.

3. The fuel for fuel cell, according to claim 1 wherein a concentration of the at least one additive falls within a range of 10 to 100 ppm.

4. The fuel for fuel cell according to claim 1, wherein the at least one organic compound is methanol.

5. The fuel for fuel cell according to claim 4, wherein a concentration of methanol is 50% by mole or more.

* * * * *